United States Patent [19]

Kelsey et al.

[11] Patent Number: 5,218,065
[45] Date of Patent: Jun. 8, 1993

[54] POLYMERIZATION PROCESS

[75] Inventors: Donald R. Kelsey, Fulshear; Betty M. Scardino, Katy; Dale L. Handlin, Jr., Houston, all of Tex.

[73] Assignee: Shell Oil Company, Houston, Tex.

[21] Appl. No.: 752,299

[22] Filed: Aug. 30, 1991

[51] Int. Cl.⁵ .................. C08G 61/08; C08F 4/78
[52] U.S. Cl. ..................... 526/166; 526/91; 526/169; 526/172; 526/281; 526/283; 502/102; 502/117; 502/154; 556/57; 252/182.18
[58] Field of Search ............ 526/166, 169, 283, 91, 526/172; 556/57; 502/102, 154, 117, 119; 252/182.13, 182.18

[56] References Cited

U.S. PATENT DOCUMENTS

| | | | |
|---|---|---|---|
| 3,933,778 | 1/1976 | Pampus et al. | 260/93.1 |
| 4,584,425 | 4/1986 | Tom | 585/827 |
| 4,729,976 | 3/1988 | Sjardijn et al. | 502/102 |
| 4,810,762 | 3/1989 | Sjardin et al. | 526/166 |
| 4,835,230 | 5/1989 | Khasat et al. | 526/221 |
| 4,837,188 | 6/1989 | Laval . | |
| 4,861,848 | 8/1989 | Basset et al. | 526/169 |
| 4,899,005 | 2/1990 | Lane et al. | 585/360 |
| 4,981,931 | 1/1991 | Bell | 526/166 |
| 4,994,426 | 2/1991 | Sjardijn et al. . | |
| 5,028,672 | 7/1991 | Sjardijn et al. | 526/283 X |
| 5,082,909 | 1/1992 | Bell | 526/166 X |
| 5,093,441 | 3/1992 | Sjardijn et al. | 526/283 X |

FOREIGN PATENT DOCUMENTS

| | | |
|---|---|---|
| 226957 | 7/1987 | European Pat. Off. . |
| 0283400 | 9/1988 | European Pat. Off. . |
| 313838 | 5/1989 | European Pat. Off. . |
| 0374997 | 6/1990 | European Pat. Off. . |
| 0385556 | 9/1990 | European Pat. Off. . |
| 0480447A2 | 4/1992 | European Pat. Off. . |

OTHER PUBLICATIONS

Taghizadeh et al, J. Molecular Catal., 15, 219 (1982).
Dodd et al, J. Molecular Catal., 15, 103 (1982).
Natta et al, Polym. Lett., 2, 349 (1964).
Novak et al, J. Am. Chem. Soc., 110 7542 (1988).

Primary Examiner—Fred Teskin

[57] ABSTRACT

An improved olefin metathesis catalyst system comprises a tungsten halide having an average of no more than about one halide substituent and no more than one oxygen substituent per tungsten with the remaining tungsten valences satisfied with phenolic substituents incorporating at least one meta or para electron withdrawing group and a triorganotin hydride and, optionally, a boron halide promoter. The catalyst system forms a relatively stable polymerization mixture with polycycloolefins and effectively polymerizes dicyclopentadiene in the presence of water.

34 Claims, No Drawings

POLYMERIZATION PROCESS

FIELD OF THE INVENTION

The present invention relates to an improved process for the ring-opening or metathesis polymerization of polycycloolefins such as dicyclopentadiene and to an improved olefin metathesis catalyst system employed therein. More particularly, the invention relates to an olefin metathesis catalyst system which is more tolerant of the presence of reactive impurities and which provides a relatively more stable polymerization mixture.

BACKGROUND OF THE INVENTION

The production of thermoset polymers by the ring-opening or metathesis polymerization of polycycloolefins is well known in the art. Numerous patents and literature references, both U.S. and foreign, relate to such polymerization, particularly the polymerization of dicyclopentadiene, in the presence of a variety of olefin metathesis catalyst systems. Among the more effective ring-opening polymerization catalyst systems are homogeneous catalyst systems based on tungsten or molybdenum halides, often employed with an organotin or organoaluminum compound. One such catalyst system is disclosed by Sjardijn et al, U.S. Pat. No. 4,810,762, wherein substituted phenolic tungsten halides are used with organotin hydrides. In copending U.S. patent application Ser. No. 278,101, filed Nov. 30, 1988, there is disclosed a catalyst system which comprises phenol-treated tungsten halides including the oxyhalide combined with an organotin or organoaluminum compound which is utilized with a boron halide catalyst promoter. Bulk polymerization of dicyclopentadiene in the presence of a similar catalyst is shown by U.S. Pat. No. 4,729,976.

Catalysts containing higher proportions of phenolic moieties have been shown to metathesize some olefins. Taghizadeh et al, J. Molecular Catal., 15, 219 (1982) teach catalysts of the $W(OAr)_6$ type, wherein Ar is an aryl group, and the relatively ineffective use of such catalysts with 2-pentene and norbornene. Compounds of the type $WX_2(OAr)_4$, wherein X is halogen and Ar is aryl, have been shown to effect methathesis of acyclic olefins by Dodd et al, J. Mol. Catal. 15 103 (1982).

It is characteristic of the operation of many if not most olefin metathesis catalyst systems that the presence of reactive materials such as water and oxygen should be avoided. While small amounts of such reactive materials are acceptable, amounts of water, for example, in excess of 20 parts per million (ppm) are generally to be avoided, particularly if the catalyst system is based on tungsten. As a result, it is necessary to thoroughly dry the cycloolefinic monomers prior to contact with the polymerization catalyst and to conduct the polymerization in an inert environment, e.g., in a nitrogen or argon atmosphere.

A few olefin metathesis catalyst systems based on the relatively more exotic metals are able to effect ring-opening polymerization in the presence of water. Ruthenium-based catalysts that are water tolerant and, in fact, may even require water or other polar solvent to be effective are disclosed by Natta et al, Polym. Lett., 2 349 (1964) and by Novak et al, J. Am. Chem. Soc., 110 7542 (1988). It would be of advantage, however, to provide a tungsten-based catalyst system which would effect polycycloolefin metathesis polymerization in the presence of the water normally present in the undried polycycloolefin monomers.

SUMMARY OF THE INVENTION

The present invention provides an improved olefin metathesis catalyst system for the ring-opening polymerization of polycycloolefins such as dicyclopentadiene, as well as a novel polymerization mixture containing the catalyst system and the ring-opening polymerization process which employs such a catalyst system. More particularly, the invention provides a tungsten-based catalyst having a relatively high proportion of phenol substituents and a relatively low proportion of halide substituents of the tungsten, which tungsten-based catalyst is employed with a triorganotin hydride and, optionally, a boron halide promoter. The catalyst system of the invention is more resistant to the harmful effects of small amounts of water and, together with the polycycloolefin monomer, provides a more stable polymerization mixture.

DESCRIPTION OF THE INVENTION

The process of the invention comprises the ring-opening polymerization of polycycloolefins. Suitable polycycloolefins are hydrocarbon of from about 7 to about 24 carbon atoms containing at least one norbornene group. In a preferred embodiment, however, the process is utilized to effect the ring-opening polymerization of dicyclopentadiene, a process which is broadly known. The dicyclopentadiene monomer is also well known and is often obtained as a by-product of olefin crackers. Dicyclopentadiene exists in two stereoisomeric forms, an endo form and an exo form, and either stereoisomer or a mixture of stereoisomers is useful in the process of the invention although the more common endo form is preferred. Particularly useful are commercially available technical grades of dicyclopentadiene of approximately 83-95% purity. These technical grades will contain some water and are liquid at ambient temperatures. They are easily processed whereas pure endo-dicyclopentadiene is normally a solid melting at 32° C.

To effect ring-opening polymerization of the dicyclopentadiene, the monomer is contacted under polymerization conditions with the catalyst system of the invention which comprises certain phenolic-substituted tungsten compounds and triorganotin hydride, optionally used in conjunction with a boron halide promoter. The tungsten-containing catalyst compounds are tungsten halides including oxyhalides having an average of no more than about one mole of halogen per tungsten, optionally one oxygen substituent and the remaining valences of the tungsten satisfied with substituted-phenolic groups. A preferred tungsten-containing catalyst system component of this type is illustrated by the tungsten compounds of the formula

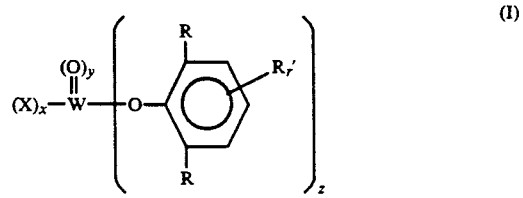

(I)

where X independently is halo, i.e., fluoro, chloro, bromo or iodo, preferably chloro or bromo, x is an average positive number equal to or less than 1, y is 0 or 1 and z is 6−2y−x. In the above formula I, R independently is hydrogen, fluoro, chloro, trifluoromethyl or methyl, preferably hydrogen, R' independently is an inert electron withdrawing group illustrated by halo or haloalkyl, and r is 1, 2 or 3. Exemplary R' groups are chloro, bromo, fluoro, trichloromethyl, trifluoromethyl, dichloromethyl, pentafluoroethyl and heptafluoropropyl. The R' groups are suitably substituted on ring carbon atoms meta or para to the carbon atom through which the aromatic ring is connected to the oxygen but phenoxy groups with meta R' substitution are preferred. Illustrative of suitable phenolic substituents of the tungsten in the above formula I are m-fluorophenoxy, p-fluorophenoxy, 2,3,5-trifluorophenoxy, 2,3,4,5-tetrafluorophenoxy, 2,3,4,5,6-pentafluorophenoxy, 2,4-dichlorophenoxy, 3,5-dichlorophenoxy, 3-bromophenoxy, m-trifluoromethylphenoxy, p-trifluoromethylphenoxy, 3-chloro-4-trichloromethylphenoxy, 3,5-bis(trifluoromethyl)phenoxy, and 3,4,5-tris(trifluoromethyl)phenoxy. Particularly preferred as the R' substituent is trifluoromethyl, particularly a m-trifluoromethyl, and the preferred value for r is 1. Thus, illustrative tungsten-containing catalyst system components of the above formula I are pentakis(3-trifluoromethylphenoxy)tungsten chloride, pentakis(2,3,5-trifluorophenoxy)tungsten bromide, tris(4-chlorophenoxy)tungsten oxychloride and tris(4-trifluoromethylphenoxy)tungsten oxychloride. It should be appreciated that in the above formula I the term x represents an average number which may not be an integer and as a result so does z. It may not therefore be possible to represent the tungsten-containing catalyst system by a single chemical name or structure in the instances where x is an average number less than unity. In such instances this catalyst system component may be considered a complex mixture of phenolic-substituted tungsten compounds such that, on average, the tungsten component is represented by formula I.

The tungsten-containing catalyst system components of the above formula I are produced by heating in an inert environment the hexavalent tungsten compound of the formula

with c moles of the substituted phenol of the formula

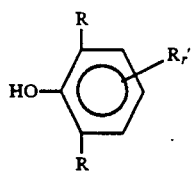

wherein X, y, R, R' and r have the previously stated meanings, a is 4 or 6, a+2y is 6 and c is a−x where x has the previously stated meaning.

The triorganotin hydride component of the catalyst system is a trialkyltin hydride or triaryltin hydride wherein each alkyl or aryl group independently has up to 10 carbon atoms inclusive. Illustrative of such triorganotin hydrides are triethyltin hydride, trimethyltin hydride, triisopropyltin hydride, tributyltin hydride, trioctyltin hydride, dimethylhexyltin hydride, ethylpropyloctyltin hydride, triphenyltin hydride and tritolyltin hydride. The preferred triorganotin hydrides are trialkyltin hydrides wherein each alkyl is straight-chain of from 3 to 8 carbon atoms inclusive. Particularly preferred is tri-n-butyltin hydride.

The triorganotin hydride is employed in an amount from about 1 mole to about 15 moles per mole of tungsten compound. Preferred amounts of trialkyltin hydride are from about 2 moles to about 8 moles per mole of tungsten compound. Amounts of catalyst system sufficient to provide from about 0.0001 mole to about 0.05 mole of tungsten compound per mole of polycycloolefin to be polymerized are suitable. Amounts of catalyst system sufficient to provide from about 0.001 mole to about 0.01 mole of tungsten compound per mole of cycloolefin monomer are preferred.

It is, on occasion, useful to provide to the catalyst system, as promoter, a boron halide, e.g., boron trihalides, boron trihalide complexes or tetrahaloborates. Illustrative of suitable boron halides are boron trifluoride, boron trichloride, boron tribromide, boron trifluoride diethyl ether complex, boron trifluoride dibutyl ether complex, tetrafluoroboric acid, methylboron difluoride, phenylboron dichloride, ammonium tetrafluoroborate, boron trichloride dimethylsulfoxide complex and boron trifluoride alkanol complexes. Particularly useful are boron trifluoride and its diethyl ether and dibutyl ether complexes. The use of boron halide promoter is optional and is not required and the promoter can be present in amounts up to 10 moles per mole of tungsten compound. When boron halide promoter is present, amounts of boron halide from about 0.05 mole to about 2 moles per mole of tungsten compound are preferred.

The ring-opening polymerization of the invention is conducted by contacting the polycycloolefin monomer and the catalyst system under polymerization conditions. It is, on some occasions, useful to provide an inert diluent in order to solubilize the catalyst system components. The catalyst system components will typically have the necessary solubility in the polycycloolefin to be polymerized and in the preferred embodiment no added diluent is employed and the catalyst system components and the polycycloolefinic monomer are contacted directly. Suitable polymerization conditions for such contacting include a polymerization temperature of from about 25° C. to about 250° C. with polymerization temperatures from about 75° C. to about 200° C. being preferred. The polymerization pressure is that pressure required to maintain the polymerization mixture in a non-gaseous state. Such pressures will vary with the reaction temperature but pressures up to about 5 atmospheres are satisfactory and frequently ambient pressure is suitable and is preferred.

In an illustrative polymerization, the monomer and catalyst system are mixed at a relatively low temperature at which rapid polymerization does not occur. The relatively low reaction rate permits efficient mixing or other processing of the polymerization mixture including the incorporation of fillers, reinforcements, anti-oxidants, stabilizers, pigments, elastomers or other materials provided to influence the properties of the polymerization product. A particularly contemplated embodiment of the process is in a reaction injection molding (RIM) process. Because of the relatively low initial rate of reaction, the monomer and catalyst system are mixed, typically by providing each component of the catalyst system with a portion of the cycloolefinic monomer, and the mixture is then transferred (injected) to a suitable mold including those molds for the production of large castings of complex shape. Notwithstanding the low initial reaction rate, the mixing and transfer must be accomplished rather quickly, for in a typical RIM process, the mixing/transfer time is on the order of a few seconds. Moreover, shortly after mixing of the monomer and catalyst system, a significant reaction exotherm occurs which substantially increases the temperature of the polymerizing mixture. While such an exotherm is at least in part beneficial in that the time for polymerization in the mold is reduced, it also requires that processing of the polymerization mixture be rapidly completed.

It is characteristic of the process of the invention employing the catalyst system of the invention that a large, relatively rapid reaction exotherm does not take place soon after mixing, especially when undried monomer is used. Upon mixing of the monomer and catalyst system according to the process of the invention, a longer time passes, often on the order of minutes, before any reaction exotherm or gellation is observed, even when the reaction mixture is heated or being heated. However, after the initial mixing and delay, a rapid, vigorous, exothermic polymerization takes place which raises the temperature of the polymerizing mixture. In contrast with conventional polymerization mixtures, the "step-cure" polymerization of the present process provides a more stable polymerization mixture and provides opportunity for more efficient mixing of the polymerization mixture or more extensive processing of the mixture before the degree of polymerization is such that further processing is not permitted, and little premature gellation or polymerization of the reaction mixture is observed. As a result, it is possible to mix the monomer and catalyst system before introduction to a RIM-type mold and use a single injection stream rather than the two injection streams employed in conventional RIM processes.

It is also characteristic of the process and catalyst system of the invention that the trace amounts of water normally found in undried polycycloolefins are better tolerated and in some cases may be beneficial. Commercially available technical grade dicyclopentadiene will normally contain from about 70 ppm to about 110 ppm of water. The presence of this moisture will render inefficient most conventional olefin metathesis catalyst systems and the cycloolefin feed to most metathesis polymerization processes must be dried as by treatment with molecular sieves. The present process operates well when cycloolefin monomers containing such quantities of water are employed. Despite the advantages of water tolerance for the catalyst systems of the invention, it is still useful on most occasions to conduct the polymerization under an inert atmosphere, e.g., argon or nitrogen, to exclude reactive impurities such as most of the oxygen. However, relatively small amounts of air or oxygen are advantageous, particularly if undried monomer is employed.

The products of the process of the invention are hard, insoluble, crosslinked thermoset polymers having utility conventional for such thermoset polymers. Particular applications are the production of parts and housings for automotive applications and the production of circuit boards and encapsulating material for electrical and electronic applications.

The invention is further illustrated by the following Comparative Examples (not of the invention) and the Illustrative Embodiments which should not be regarded as limiting.

ILLUSTRATIVE EMBODIMENT I

In a dry box, a 200 ml reaction flask with a stopcock side arm and a magnetic stir bar was charged with 3.966 g (10 mmole) of tungsten hexachloride rinsed into the flask with approximately 50 ml of dry toluene. The flask was then equipped with a stopcock septum inlet adapter and spring clamp. A serum bottle was charged with a toluene solution containing 44.58 g (55 mole) of dried m-trifluoromethylphenol and the bottle was sealed. A second serum bottle was charged with approximately 5 ml dry toluene. A syringe needle to be used to transfer the toluene was plugged with a rubber stopper. The flask, serum bottles and syringe were then removed from the dry box.

The reaction flask was then placed in an oil bath of controllable temperature located in a hood. The side arm of the inlet adapter was connected by rubber tubing to an argon supply and the top of the inlet adapter was connected by tygon tubing to a small oil bubbler. The tubing, inlet adapter and bubbler were then thoroughly flushed with argon. The tygon tubing was then removed and quickly connected to the side arm of the reaction flask. The top of the inlet adapter was sealed with a small serum cap and the adapter and side arm stopcocks opened to allow argon to flow through the inlet adapter, into the flask, out the side arm and through the bubbler. A larger bubbler was charged with 6 g of dried poly(vinylpyridine), weighed and connected to the outlet of the small bubbler to trap within the polymer the hydrogen chloride evolved in the flask.

The reaction mixture was heated to 70° C. in the oil bath and the m-trifluoromethylphenol solution was transferred to the reaction flask with the syringe. The serum bottle formerly containing the m-trifluoromethylphenol and the syringe were then rinsed with the 5 ml of dry toluene and the rinse was added to the reaction flask. The small serum cap on the inlet adapter was covered with a larger serum cap. After approximately 74 hours at 70° C. the oil bath temperature was raised to 95° C. for about 26 hours under argon flow and then cooled to room temperature.

The toluene was then removed by lowering the pressure to 20–30 mbar. After removal of most of the toluene at room temperature, the pressure was lowered to about 1–2 mbar and the flask was heated to 50° C. while the flask was repeatedly evacuated and then filled with argon to remove the last traces of toluene. The flask, under vacuum, was returned to the dry box and the tungsten catalyst, containing approximately 5.5 moles of the m-trifluoromethylphenoxy substituent and 0.5 mole of chloride substituent (on average) per mole of tungsten, was dissolved in dry dicyclopentadiene to make a 20% by weight solution.

Comparative Example I

By the procedure of Illustrative Embodiment I, a catalyst was prepared from 0.862 g (2.52 mmole) of tungsten oxytetrachloride and 5.28 mmol of 2,6-diisopropylphenol heated to 95° C. in the oil bath. The final product was produced as a 7.4% by weight solution in dry, degassed dicyclopentadiene.

ILLUSTRATIVE EMBODIMENT II

In a controlled atmosphere dry nitrogen box, 30 ml dried, silanized serum bottles each containing a magnetic stir bar were each charged with 0.326 g (0.059 mmole) of the 20% by weight solution of Illustrative Embodiment I. Each bottle was then sealed and removed from the dry box. While under an argon purge via syringe needles, 15.3 g of undried, undegassed dicyclopentadiene (containing about 95 ppm water) was injected into each bottle and the vent needles removed. The sealed bottles were then aged for varying time in a dry box at room temperature. At the time of testing, each bottle was removed from the box and the contents were swept with argon. A thermocouple protector tube was placed near center of each bottle and 0.0537 g (0.236 mmole) of tributyltin hydride was added as a 12.8% by weight solution in dicyclopentadiene. The mixture was then placed in an oil bath at 90° C. and a thermocouple inserted into the protection tube. The mixtures were monitored for temperature change for a minimum of 40 minutes or until the temperature reached a maximum value above that of the oil bath and then began to decline. The results are shown in Table I.

By the same technique, as a control, polymerization employing the catalyst of Comparative Example I was evaluated. The results of these polymerizations are shown in Table II.

TABLE I

| Run | Aging Time (hr) | $BF_3$ Promoter (mmole) | Onset Time (min) | Onset Temp. (°C.) | Exotherm Maximum Time (min) | Exotherm Maximum Temp. (°C.) |
|---|---|---|---|---|---|---|
| 1 | 0 | 0 | 30.4 | 91 | 31.6 | 218 |
| 2 | 1.5 | 0 | 16.0 | 90 | 16.7 | 230 |
| 3 | 24 | 0 | 15.8 | 91 | 16.5 | 223 |
| 4 | 48 | 0 | 12.4 | 92 | 13.1 | 216 |
| 5 | 72 | 0 | 22.9 | 91 | 23.2 | 206 |
| 6 | 0 | 0.015* | N.R. | — | — | — |
| 7 | 48 | 0.015* | 36.3 | 91 | 37.5 | 222 |

*As the dibutyl ether complex
N.R. signifies no reaction observed

TABLE II

| Run | Aging Time (hr) | $BF_3$ Promoter (mmole) | Onset Time (min) | Onset Temp. (°C.) | Exotherm Maximum Time (min) | Exotherm Maximum Temp. (°C.) |
|---|---|---|---|---|---|---|
| 1 | 0 | 0 | NE | | | |
| 2 | 1.5 | 0 | NE | | | |
| 3 | 48 | 0 | SE | | | |
| 4 | 552 | 0 | SE | | | |
| 5 | 0 | 0.015* | NE | | | |
| 6 | 48 | 0.015* | NE | | | |
| 7 | 60 | 0.015* | 7.2 | 93 | 11.1 | 159 |

*As the dibutyl ether complex
NE signifies no exotherm observed
SE signifies slight exotherm Similar experiments were conducted using degassed, undried dicyclopentadiene with both catalyst systems and aging the monomer/catalyst mixture for 24 hours before heating in the bath. In no case was an exotherm observed.

ILLUSTRATIVE EMBODIMENT III

A catalyst was prepared by a process essentially similar to that of Illustrative Embodiment I except that 0.603 g (1.765 mmole) of tungsten oxytetrachloride and 5.722 g (7.06 mmole) of m-trifluoromethylphenol in toluene were used. After 1 hour at room temperature, the mixture was heated to 50° C. for about 50 minutes, to 70° C. for about 15 minutes and to 95° C. for about 42 hours. The final product was made up as a 7.5% by weight solution in dry dicyclopentadiene.

ILLUSTRATIVE EMBODIMENT IV

A catalyst was prepared by a procedure substantially similar to that of Illustrative Embodiment I except that 0.9914 g (2.5 mmole) of tungsten hexachloride and 36.58 g (12.5 mmole) of a toluene solution of p-trifluoromethylphenol were employed. The mixture was heated at 50° C. for 1 hour, at 95° C. for about 50 hours and then at 50° C. for 68 hours. The final product was made up as a 7% by weight solution in dry dicyclopentadiene.

Comparative Example II

A catalyst was prepared by a process essentially similar to that of Comparative Example I except that 1.98 g (5.0 mmole) of tungsten hexachloride and 9.93 g (approx. 10 mmoles) of 2,6-diisopropylphenol in toluene were used.

ILLUSTRATIVE EMBODIMENT V

Comparative Example III

By procedures essentially similar to that of Illustrative Embodiment II, polymerizations were conducted using the catalysts produced according to the procedure of Illustrative Embodiments (IE) I, III and IV. The results are shown in Table III. For comparison, evaluations of the catalysts of Comparative Examples (CE) I and II were made. The results are shown in Table IV. In both evaluations, however, the dicyclopentadiene employed was dry and degassed. Except where noted, 0.059 mmole of the catalyst was used as in Illustrative Embodiment II.

TABLE III

| IE | Tributyltin hydride (mmole) | $BF_3$ as $Bu_2O$ Complex (mmole) | Onset Time (min) | Onset Temp. (°C.) | Exotherm Time (min) | Exotherm Temp. (°C.) |
|---|---|---|---|---|---|---|
| I | 0.220 | 0 | 4.1 | 90 | 4.7 | 237 |
| I | 0.472 | 0.059 | 2.2 | 80 | 2.6 | 223 |
| I* | 0.156 | 0.010 | 8.0 | 89 | 9.1 | 239 |
| I* | 0.156 | 0.039 | 8.1 | 84 | 9.2 | 227 |
| I | 0.236 | 0 | 2.3 | 75 | 2.9 | 214 |
| I* | 0.156 | 0 | 3.6 | 87 | 4.3 | 231 |
| I* | 0.156 | 0.010 | 2.4 | 68 | 3.0 | 218 |
| III | 0.236 | 0 | 15.9 | 92 | 17.0 | 217 |
| IV | 0.220 | 0 | 2.0 | 69 | 2.4 | 231 |

*0.039 mmole catalyst

TABLE IV

| CE | Tributyltin hydride (mmole) | $BF_3$ as $Bu_2O$ Complex (mmole) | Onset Time (min) | Onset Temp. (°C.) | Exotherm Time (min) | Exotherm Temp. (°C.) |
|---|---|---|---|---|---|---|
| I | 0.220 | 0 | 2.2 | 57 | 3.0 | 173 |
| I | 0.220 | 0 | 2.1 | 82 | 2.8 | 183 |
| I | 0.220 | 0.029 | 0.1 | 25 | 0.3 | 173 |
| II | 0.220 | 0 | 6.4 | 68 | 8.0 | 198 |
| II | 0.220 | 0.030 | 0.1 | 40 | 1.0 | 189 |

These data illustrate that, even with dry monomer, the catalyst compositions of this invention can result in conveniently long delay times and/or higher exotherm temperatures than those of the conventional catalysts even in the presence of $BF_3$. Note that the catalyst of IE III has an even longer delay than the catalyst of IE I.

ILLUSTRATIVE EMBODIMENT VI

Employing a procedure substantially similar to that of Illustrative Embodiment II, a serum bottle was charged with 0.326 g of the 20% solution of the catalyst of Illustrative Embodiment I (in dry dicyclopentadiene), 15.3 g of undried, undegassed dicyclopentadiene (approx. 95 ppm water) and 0.537 g of tributyltin hydride (as a 12.8% solution in dried dicyclopentadiene). This mixture was aged for 96 hours at ambient temperature, at which time the mixture was liquid. The bottle was placed in a 90° C. oil bath and after 48.6 minutes a rapid polymerization ensued which caused the temperature of the mixture to rise to 200° C. in 2.2 minutes.

When this experiment was repeated using dry (less than 10 ppm) degassed dicyclopentadiene, a hard gel was formed after aging less than 96 hours at ambient temperature.

ILLUSTRATIVE EMBODIMENT VII

Employing the general procedure of Illustrative Embodiment II, dicyclopentadiene (DCP) was polymerized in a mold in the presence of catalyst system containing the components (a) the tungsten catalyst of Illustrative Embodiment I, and (b) tributyltin hydride. The dicyclopentadiene and catalyst components were mixed at ambient temperature and then transferred to the mold which had been heated to 100° C. Polymerization was not detected outside of the mold, but upon injection of the polymerization mixture into the mold, an exotherm took place which peaked within 45 sec. The ratios of catalyst system components and the properties of the resulting polymer are shown in Table V.

TABLE V

| Sample | Ratio DCP: (a):(b) | Flexural Modulus psi | Flexural Strength psi | Izod Impact ft-lb | % Swell in Toluene | $T_g$ °C. |
|---|---|---|---|---|---|---|
| 1 | 1500:1:4 | 323,000 | 12,300 | 0.6 | 151 | 131 |
| 2 | 2000:1:4 | — | — | — | 155 | 128 |
| 3 | 3000:1:4 | 313,000 | 11,800 | 0.5 | 161 | 122 |

What is claimed is:

1. A composition represented by the formula

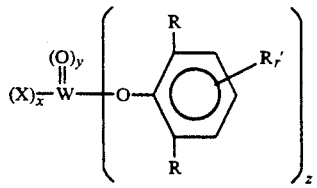

wherein X independently is halo, R independently is hydrogen, fluoro, chloro, trifluoromethyl or methyl, R' independently is an inert electron withdrawing group, x is an average positive number equal to or less than 1, y is 0 or 1, z is 6−2y−x and r is 1, 2 or 3.

2. The composition of claim 1 wherein R is hydrogen and R' is halo or haloalkyl.

3. The composition of claim 2 wherein y is 0.

4. The composition of claim 3 wherein X is chloro or bromo.

5. The composition of claim 4 wherein R' is trihalomethyl.

6. The composition of claim 5 wherein R' is trifluoromethyl.

7. The composition of claim 6 wherein X is chloro.

8. The composition of claim 7 wherein the trifluoromethyl is substituted on an aromatic ring carbon atom meta to the ring carbon atom through which the aromatic ring is connected to the oxygen.

9. The composition of claim 2 wherein y is 1.

10. The composition of claim 9 wherein X is chloro or bromo.

11. The composition of claim 10 wherein R' is trifluoromethyl.

12. The composition of claim 11 wherein X is chloro.

13. The composition of claim 12 wherein the trifluoromethyl is substituted on an aromatic ring carbon atom located meta to the carbon atom through which the aromatic ring is attached to the oxygen.

14. An olefin metathesis polymerization catalyst system comprising the composition of claim 1 and a triorganotin hydride, and optionally, a boron halide promoter.

15. An olefin metathesis catalyst system comprising the composition of claim 2 and a trialkyltin hydride wherein each alkyl has up to 10 carbon atoms inclusive, and optionally, a boron halide promoter.

16. The system of claim 15 wherein the trialkyltin hydride is a trialkyltin hydride in which each alkyl independently is straight-chain alkyl of from 3 to 8 carbon atoms inclusive.

17. The system of claim 16 wherein, in the tungsten compound, X is chloro, R is hydrogen and R' is trihalomethyl, the trialkyltin hydride is tributyltin hydride and the promoter is not present.

18. The system of claim 17 wherein R' is trifluoromethyl.

19. The system of claim 16 wherein, in the tungsten compund, X is chloro, R is hydrogen and R' is trihalomethyl, the trialkyltin hydride is tributyltin hydride and boron halide promoter selected from boron trifluoride, diethyl ether complexes of boron trifluoride or dibutyl ether complexes of boron trifluoride is present in an amount from about 0.005 mole to about 2 moles of promoter per mole of tungsten compound.

20. In the process of polymerizing polycycloolefin by contacting the polycycloolefin under polymerization conditions with an olefin metathesis catalyst system, the improvement of employing as the catalyst system the system of claim 14.

21. In the process of polymerizing dicyclopentadiene by contacting dicyclopentadiene under polymerization conditions with an olefin metathesis catalyst system, the improvement of employing as the catalyst system the system of claim 18.

22. The process of polymerizing dicyclopentadiene containing at least 20 parts per million of water by contacting the dicyclopentadiene under polymerization conditions with the olefin metathesis catalyst system of claim 14.

23. The process of polymerizing dicyclopentadiene containing at least 20 parts per million water by contacting the dicyclopentadiene under polymerization conditions with the olefin metathesis catalyst system of claim 18.

24. A polymerizable mixture which comprises dicyclopentadiene and the olefin metathesis catalyst system of claim 14.

25. The mixture of claim 24 wherein the mixture contains at least about 20 parts per million of water.

26. The polymerizable mixture comprising dicyclopentadiene and the olefin metathesis catalyst system of claim 18.

27. A polymerizable composition comprising (1) the reaction product of $WX_aO_y$ and c moles of the substituted phenol of the formula

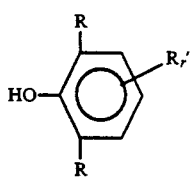

wherein X is halo, R independently is hydrogen, fluoro, chloro, trifluoromethyl, or methyl, R' independently is halo or haloalkyl, r is 1, 2 or 3, y is zero or 1, a is 4 or 6, $a+2y=6$, and c is $a-x$ wherein x is a positive number no greater than 1;

(2) a triorganotin hydride;

(3) a hydrocarbon polycycloolefin containing at least one norbornene group, and optionally, (4) boron halide.

28. The composition of claim 27 wherein the triorganotin hydride is a trialkyltin hydride wherein each alkyl independently is straight-chain alkyl of from 3 to 8 carbon atoms inclusive.

29. The composition of claim 28 wherein X is chloro, R is hydrogen, R' is trihalomethyl and r is 1.

30. The composition of claim 29 wherein R' is trifluoromethyl.

31. The composition of claim 29 wherein y is zero.

32. The composition of claim 29 wherein y is 1.

33. The composition of claim 29 wherein the trialkyltin hydride is tributyltin hydride.

34. The composition of claim 29 wherein the polycycloolefin is dicyclopentadiene.

* * * * *